Patented July 9, 1935

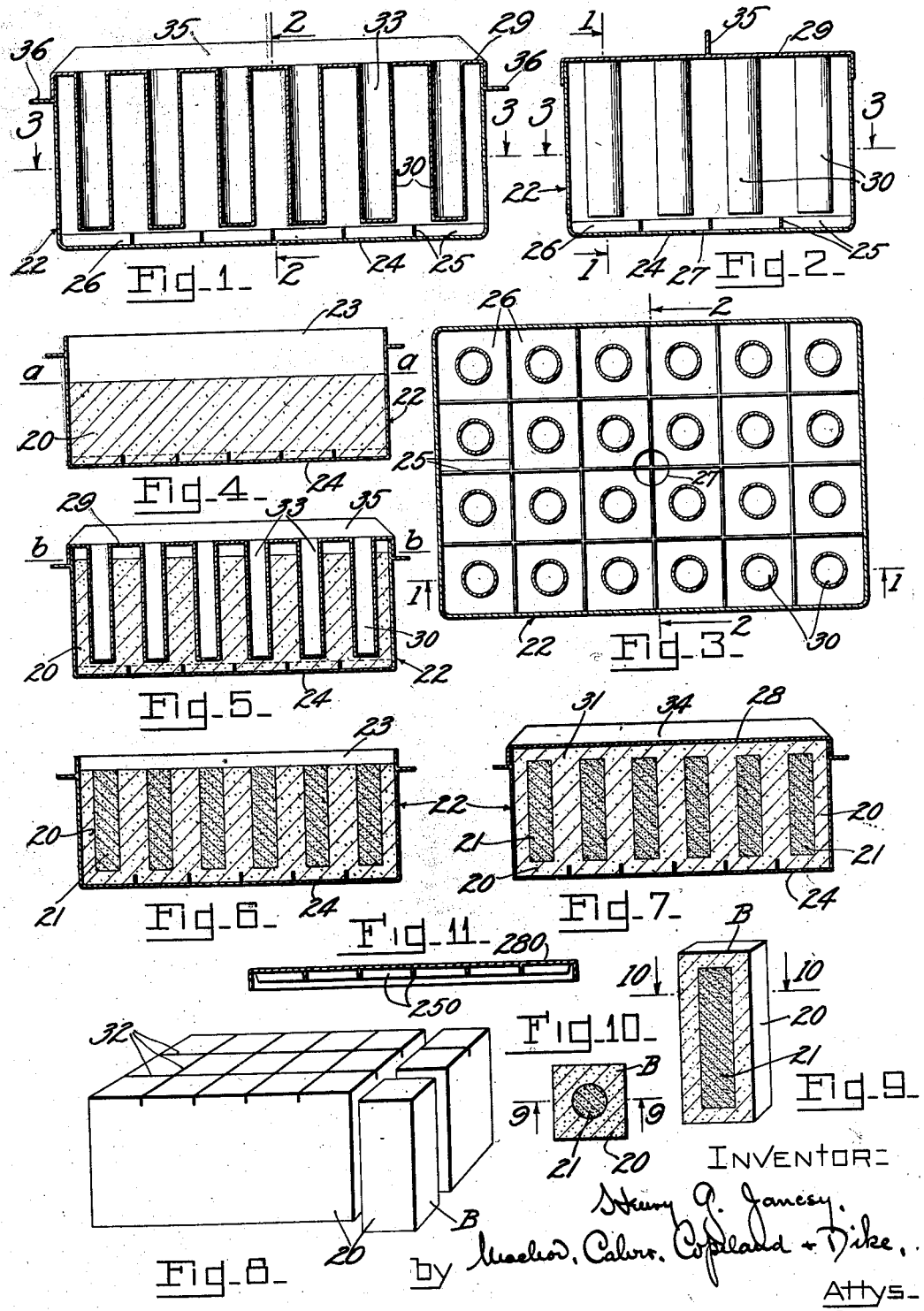

2,007,572

UNITED STATES PATENT OFFICE 2,007,572

METHOD OF MAKING ICE CREAM AND SIMILAR BLOCKS HAVING COMPLETELY ENCLOSED CORES

Henry G. Jancsy, Everett, Mass.

Application April 27, 1933, Serial No. 668,193

1 Claim. (Cl. 107—54)

The invention relates to a method of making ice cream or similar blocks having completely enclosed cores, and the object of the invention is to provide a method whereby such blocks may be conveniently and economically produced in commercial quantities.

The invention can best be seen and understood by reference to the drawing in which—

Fig. 1 is a longitudinal section taken substantially on the lines 1—1, Figs. 2 and 3; Fig. 2 is a transverse section taken substantially on the lines 2—2, Figs. 1 and 3; and Fig. 3 a horizontal section taken substantially on the lines 3—3, Figs. 1 and 2, of an apparatus embodying one feature of the invention and employed in the practice thereof.

Figs. 4, 5, 6 and 7 are longitudinal sectional views, corresponding generally to Fig. 1, illustrating successive steps in the practice of the method.

Fig. 8 is a perspective view of the mass produced by the steps illustrated by Figs. 4 to 7 and illustrating the division of the mass into individual blocks.

Fig. 9 is a longitudinal section, taken substantially on the line 9—9, Fig. 10, and Fig. 10 a transverse section, taken substantially on the line 10—10, Fig. 9 of one of the individual blocks.

Fig. 11 is a detail view of a mold cover embodying a modification.

The product to which the invention relates is shown in Figs. 9 and 10 and comprises a block 20 of ice cream or equivalent frozen edible material completely enclosing a core 21 of a fluid material suitable for use as a sauce for the ice cream 20, which fluid material may comprise soft marshmallow, a fluid chocolate, fruit, or maple syrup, or otherwise according to taste.

An apparatus suitable for forming blocks of this character is illustrated in Figs. 1 to 3. Said apparatus as shown comprises a hollow mold 22 having an open top 23 (see Figs. 4 and 6) and a bottom 24 having on its inner face projecting ribs 25 defining spaces 26. Said ribs may be formed integral with said bottom or in the form of a separate removable grid as preferred. Said bottom may, if desired, be formed with a central opening 27 to facilitate the removal of the product. Two interchangeable covers for the mold 22 are provided, one being a plain cover as shown at 28 in Fig. 7, the other, shown at 29 in Figs. 1, 2 and 5 being provided on its inner face with a plurality of hollow, parallel, tubular projections 30 which are open at their outer ends, as shown at 33, and are so arranged and proportioned that, when said cover is applied to the mold, said projections extend into the latter with their axes substantially central of the spaces 26, and with their inner ends spaced from the bottom 24 of the mold. The covers 28 and 29 are preferably provided with handles 34 and 35, respectively, to facilitate their removal, and the mold 22 may if desired be provided at its ends with flanges 36 to facilitate handling.

In use, in accordance with the present method, the mold 22 is partially filled with a body of frozen but relatively soft ice cream 20, as shown in Fig. 4. The cover 29 is then applied, causing the projections 30 borne by it to displace the ice cream and form openings therein which extend from the upper surface of the mass to points spaced from the bottom thereof and from the bottom 24 of the mold. The original partial filling of the mold is to such a level, indicated at a, a, Fig. 4, that, when the ice cream is displaced by the projections 30, it will rise to a level indicated at b, b, Fig. 5, higher than its original level a, a, but still below the top of the mold. Thereafter the mold is chilled in any convenient way, as by passing the same through a refrigerating apparatus, to harden the ice cream which, until sufficiently hardened, is restrained by the projections 30 from flowing back into the openings formed by said projections. When the ice cream has been sufficiently hardened, the cover 29 bearing the projections 30 is removed and the openings filled with the fluid core material 21, as shown in Fig. 6. If necessary, the removal of the cover 29 and projections 30 may be facilitated by introducing warm water into the hollow projections from their open outer ends 33, in order that they may be readily withdrawn from the openings in the ice cream 20 without displacing the latter. Thereafter a further layer of ice cream, indicated at 31 in Fig. 7, is added to cover the entire core body and core material and complete the filling of the mold. This further layer of ice cream must of necessity be a relatively soft ice cream else it could not be spread to cover the core body and core material. The cover 28 is then applied and the mold again chilled to harden the layer 31 and solidify the entire mass of ice cream the top layer of ice cream will then become bonded to the core body; the whole forming one homogeneous mass. Thereafter the cover 28 is removed, the mold inverted, and the frozen mass, shown in Fig. 8, discharged therefrom. Due to the ribs 25, said mass will be scored along the lines 32 which serve as guides for the final operation which consists in cutting said mass into individual blocks B between the filled openings or cores 21, which cores are therefore left completely enclosed by the ice cream of the several individual blocks.

If desired, the ribs 25 may be omitted from the bottom of the mold and formed on a cover 280 corresponding to the cover 28 as shown at 250 in Fig. 11. The construction first described is, however, preferred, since the convenient way of ejecting the frozen mass from the mold 22 is to invert the latter, and in such event the scorings 32 appear in a convenient position at the top of the stock.

It will be seen that the resulting product, shown in Figs. 9 and 10 and at B in Fig. 8, can, under properly refrigerated conditions, be kept in stock for a considerable time, sold as required, and transported to any convenient point for consumption. Such a block, particularly if provided with a chocolate or similar coating in accordance with a well known practice, can, if desired, be eaten from the hand without inconvenience or, if served upon a plate, can be cut open, permitting the fluid sauce to flow over the ice cream in the customary manner.

What I claim is:

The method of making in mass a number of ice cream blocks each having a core completely enclosed at its sides and ends, which includes partially filling a mold with frozen but relatively soft ice cream, displacing the ice cream by forcing inserts therein to form openings extending from the upper surface to points spaced from the bottom thereof and thereby causing the ice cream to rise in the mold to a level higher than its original level but below the top of the mold, chilling the mold before removing said inserts to harden the ice cream and prevent it from flowing back into said openings when the inserts are removed, removing the inserts, filling said openings with core material, adding a continuous layer of relatively soft ice cream to cover said core body and core material and complete the filling of the mold, again chilling the mold and entire molded mass therein so that the added top layer will become bonded to the core body, removing the molded and chilled mass from the mold, and cutting the same between the filled openings into individual blocks.

HENRY G. JANCSY.